United States Patent Office 3,773,764
Patented Nov. 20, 1973

3,773,764
HYDRAZONE DYESTUFFS
Klaus-Friedrich Lehment, Leverkusen, Ernst Schmitt, Cologne, and Roderich Raue, Leverkusen, Germany, assignors to Bayer Aktiengesellschaft, Leverkusen, Germany
No Drawing. Filed June 23, 1971, Ser. No. 156,072
Claims priority, application Germany, June 24, 1970,
P 20 31 202.1
Int. Cl. C07d 27/38
U.S. Cl. 260—240 G                    11 Claims

ABSTRACT OF THE DISCLOSURE

Hydrazone dyestuffs of formula

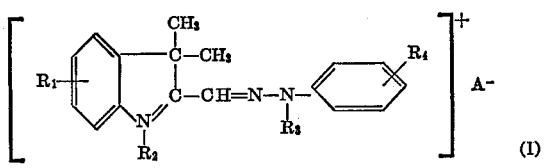

wherein $R_1$ and $R_4$ represent hydrogen, halogen, lower alkyl, cycloalkyl, lower alkoxy, nitro, carbalkoxy, nitrile, acyl or aralkyl, and at least one of the substituents $R_1$ and $R_4$ represents aralkyl, $R_2$ represents lower alkyl, cycloalkyl, aralkyl or aryl, $R_3$ represents alkyl and $A^-$ represents an anion, and wherein the alkyl radicals and the aromatic carbocyclic rings are not further substituted or contain further non-ionic substituents, processes for their manufacture and their use for dyeing and printing of polymerised or copolymerised acrylnitrile, acid-modified polyester fibres and polamide fibres.

---

The subject of the invention are new hydrazone dyestuffs of formula

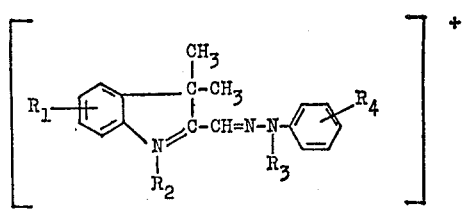

wherein $R_1$ and $R_4$ represent hydrogen, halogen, lower alkyl, cycloalkyl, lower alkoxy, nitro, carbalkoxy, nitrile, acyl or aralkyl, and at least one of the substituents $R_1$ and $R_4$ represents aralkyl which is unsubstituted or substituted in the aromatic radical by lower alkyl, halogen, nitrile, nitro, hydroxyl, lower alkoxy, acylamino or carbalkoxy,
$R_2$ represents lower alkyl, cycloalkyl, aralkyl or aryl,
$R_3$ represents alkyl, which is unsubstituted or substituted by lower carbalkoxy or lower alkoxy, or represents cycloalkyl, aralkyl or lower alkenyl, and
$A^-$ represents an anion, and wherein the aromatic carbocyclic rings are not further substituted or contain further non-ionic substituents, such as for example chlorine, bromine or fluorine atoms, or ethyl, methyl, methoxy, carbomethoxy, nitro or nitrile groups, processes for their manufacture and their use for dyeing and printing.

Lower alkyl can for example be: methyl, ethyl, n-propyl, iso-propyl, n-butyl, iso-butyl, and iso-amyl.

Halogen represents fluorine, chlorine or bromine. Lower alkoxy for example represents methoxy, ethoxy, n-propoxy, iso-propoxy and n-butoxy.

Carbalkoxy especially represents carbomethoxy, carbethoxy, carbopropoxy ad carbobutoxy.

Suitable acyl radicals are especially acetyl, propionyl, toluyl and benzoyl.

Suitable acylamino radicals are formylamino, acetylamino, n-propionylamino, benzoylamino, 4-chloro-benzoylamino and 4-methyl-benzoylamino.

Possible aralkyl radicals are for example: phenylmethyl, phenylethyl, phenylpropyl-(2,2) and optionally their derivatives which are substituted in the phenyl nucleus.

As cycloalkyl, cyclohexyl possesses special significance.

Aryl represents carbocyclic aromatic groups with 6–10 carbon atoms, such as phenyl and naphthyl.

Possible anionic residues $A^-$ are the organic and inorganic anions which are customary for basic dyestuffs, and examples which should be customary for basic dyestuffs, and examples which should be mentioned are: chloride$^-$, bromide$^-$, $CH_3SO_4^-$, $C_2H_5SO_4^-$, p-toluenesulphonate, $HSO_4^-$, $SO_4^{--}$, benzenesulphonate, p-chlorobenzenesulphonate, dihydrogen phosphate, phosphate, acetate, chloroacetate, formiate, propionate, oxalate, lactate, itaconate, crotonate, tartrate, citrate, $NO_3^-$, perchlorate, $ZnCl_3$ and the anions of saturated or unsaturated aliphatic dicarboxylic acids such as maleic acid, succinic acid, glutaric acid, adipic acid, pimelic acid and suberic acid. Colourless anions are preferred; for dyeing from an aqueous medium, those anions which do not excessively impair the solubility of the dyestuff in water are preferred. For dyeing from organic solvents, those anions are also frequently preferred which assist the solubility of the dyestuff in organic solvents or at least do not influence it negatively, for example tetrapropylenebenzenesulphonate, dodecylbenzenesulphonate as well as the anion of tetradecanecarboxylic acid and that of ethylhexylcarboxylic acid.

Alkenyl especially represents allyl and its methyl substitution products.

A preferred group within the dyestuffs according to the invention are those of general formula

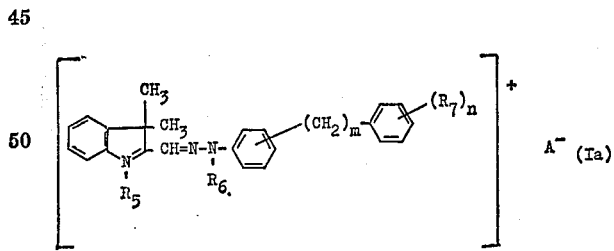

wherein $R_5$ represents methyl, ethyl or benzyl,
$R_6$ represents lower alkyl,
$R_7$ represents hydrogen or identical or different methyl, ethyl, hydroxyl, methoxy, acetylamino, benzoylamino or nitro groups,
$m$ and $n$ represent the numbers 1 or 2 and
$A^-$ represents an anion.

Particularly suitable dyestuffs are those of Formula Ia, wherein $R_6$ represents the methyl group.

Particularly preferred products are those hydrazone dystuffs according to the invention wherein the anion $A^-$ represents the acetate, lactate, succinate, itaconate or maleate anion or an anion of an aliphatic dicarboxylic acid such as of succinic acid, glutaric acid, adipic acid, pimelic acid or suberic acid. This is because dyestuffs with these anions are particularly easily soluble; in part, they reach extraordinary solubilities, such as 300 g. per litre or above.

The new hydrazone dystuffs can be manufactured if, in a manner which is in itself known, amines of formula

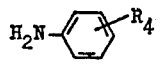    (II)

are diazotised and coupled with compounds of formula

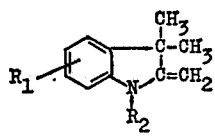    (III)

wherein $R_1$ and $R_4$ represent hydrogen, lower alkyl, cycloalkyl, lower alkoxy, nitro, carbalkoxy, nitrile, acyl or aralkyl, and at least one of the radicals $R_1$ and $R_4$ represents aralkyl which is unsubstituted or substituted in the aromatic radical by lower alkyl, halogen, nitrile, hydroxyl, lower alkoxy, acylamino or carbalkoxy, $R_2$ represents lower alkyl, cycloalkyl, aralkyl or aryl, the resulting coupling product is reacted by treatment with alkali, in a manner which is in itself known, to give the azo base of formula

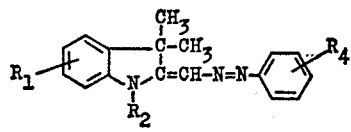    (IV)

wherein $R_1$, $R_2$ and $R_4$ have the above-mentioned meaning, and these are converted by means of an alkylating agent into the final dyestuffs.

The dyestuffs of Formula Ia can also be prepared in the same manner.

A replacement of dyestuff anions by other dyestuff anions can be effected by treating the basic dyestuff with acid-binding agents such as sodium carbonate, potassium carbonate, ammonium carbonate, magnesium carbonate, sodium hydroxide, potassium hydroxide, ammonia and silver oxide, optionally in an aqueous medium, whereby the dyestuff-onium base (or the carbinol base) is produced, and treating these with anion-releasing agents, these anions being different from those of the basic dyestuff employed. Formate, acetate and lactate are preferred as anions to be introduced in this way.

As amine components of Formula II there may for example be mentioned:

4-aminodiphenylmethane,
4-aminodiphenylethane,
4-amino-4'-nitrodiphenylmethane,
4-amino-4'-hydroxydiphenylmethane,
4-amino-4'-hydroxydiphenylpropane-(2,2),
4-amino-4'-ethyldiphenylmethane,
4-amino-4'-methyldiphenylmethane,
3-aminodiphenylmethane,
3-amino-4'-methyldiphenylmethane,
3-amino-2',4'-dimethyldiphenylmethane,
3-amino-2',5'-dimethyldiphenylmethane,
3-amino-4-methyl-2',4'-dimethyldiphenylmethane,
3-amino-4-methyl-4'-methyldiphenylmethane,
2-aminodiphenylmethane,
3-amino-2',4',6'-trimethyldiphenylmethane,
3-amino-4'-methoxydiphenylmethane,
4-amino-4'-acetylamino-diphenylmethane,
4-amino-4'-benzoylamino-diphenylmethane,
aniline,
p-toluidine,
2-anisidine,
4-anisidine,
4-aminoacetanilide,
p-chloroaniline and
p-fluoraniline.

Possible coupling components of Formula III are, for example:

1,3,3-trimethyl-2-methylene-2,3-dihydroindole,
1,3,3,5-tetramethyl-2-methylene-2,3-dihydroindole,
1,3,3-trimethyl-5-chloro-2-methylene-2,3-dihydroindole,
1,3,3-trimethyl-5-methoxy-2-methylene-2,3-dihydroindole,
1,3,3-trimethyl-5-carbomethoxy-2-methylene-2,3-dihydroindole,
1,3,3-trimethyl-5-carbethoxy-2-methylene-2,3-dihydroindole,
1,3,3-trimethyl-5-cyclohexyl-2-methylene-2,3-dihydroindole,
1,3,3-trimethyl-5-benzyl-2-methylene-2,3-dihydroindole,
1,3,3-trimethyl-5-nitro-2-methylene-2,3-dihydroindole,
1,3,3-trimethyl-7-methyl-2-methylene-2,3-dihydroindole,
1,3,3-trimethyl-5-trifluoromethyl-2-methylene-2,3-dihydroindole,
1,3,3-trimethyl-7-methoxy-2-methylene-2,3-dihydroindole,
1,3,3-trimethyl-7-chloro-2-methylene-2,3-dihydroindole,
1-ethyl-3,3-dimethyl-2-methylene-2,3-dihydroindole,
1-ethyl-3,3,5-trimethyl-2-methylene-2,3-dihydroindole,
1-ethyl-3,3-dimethyl-5-chloro-2-methylene-2,3-dihydroindole,
1-ethyl-3,3-dimethyl-5-methoxy-2-methylene-2,3-dihydroindole,
1-ethyl-3,3-dimethyl-5-carbomethoxy-2-methylene-2,3-dihydroindole,
1-ethyl-3,3-dimethyl-5-carbethoxy-2-methylene-2,3-dihydroindole,
1-ethyl-3,3,7-trimethyl-5-cyclohexyl-2-methylene-2,3-dihydroindole,
1-ethyl-3,3-dimethyl-5-benzyl-2-methylene-2,3-dihydroindole,
1-ethyl-3,3-dimethyl-5-nitro-2-methylene-2,3-dihydroindole,
1-benzyl-3,3-dimethyl-2-methylene-2,3-dihydroindole and
1-phenyl-3,3-dimethyl-2-methylene-2,3-dihydroindole.

The alkylation can be carried out by warming the solution or suspension of a compound in an inert medium with the alkylating agent to 60–150° C., preferably 80–120° C. For this purpose, the alkylating agent can also be used in excess, as the solvent.

Suitable inert media are, for example, organic liquids such as benzine, ligroin, cyclohexane, benzene, toluene, chlorobenzene and dichlorobenzene, nitrobenzene, tetralin, dioxane and dimethylformamide.

Suitable alkylating agents are, for example, dimethyl sulphate, diethyl sulphate, di-n-butyl sulphate, di-iso-amyl sulphate, dimethyl pyrosulphate, benzenesulphonic acid methyl ester, ethyl ester, n-propyl ester, isopropyl ester and isobutyl ester, toluenesulphonic acid methyl ester, ethyl ester, n-propyl ester, isopropyl ester and isobutyl ester, methyl iodide, ethyl iodide, n-butyl bromide, allyl bromide, 2-chloro- and 2-bromo-diethyl ether as well as chloracetic and bromacetic acid esters, such as chloracetic and bromacetic acid ethyl esters.

The alkylation can also be carried out in the presence of alkaline agents, especially in the presence of tertiary amines which possess sterically bulky substituents on the N-atom, in accordance with Belgian patent specification No. 735,565. Triisopropanolamine is particularly suitable as an amine with sterically bulky substituents.

The new products are valuable dyestuffs which can be used for dyeing and printing materials made of leather, mordanted cotton, cellulose, synthetic polyamides and polyurethanes, and also for dyeing lignin-containing fibres, such as coir, jute and sisal. They are furthermore suitable for the manufacture of writing fluids, rubber-stamp inks and ball pen pastes, and can also be used in flexographic printing.

Suitable materials for dyeing with the basic dyestuffs of the above general formula are especially flocks, fibres, filaments, strips, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides, and asymmetric dicyanethylene, or flocks, fibres, filaments, strips, woven fabrics or knitted fabrics of acid-modified aromatic polyesters and acid-modified polyamide fibres. Acid-modified aromatic polyesters are for example polycondensation products of sulphoterephthalic acid and ethylene glycol, that is to say polyethylene glycol terephthalates containing sulphonic acid groups (of the type of Dacron 64 of E.I. Du Pont de Nemours and Company), as are described in Belgian patent specification No. 549,179 and U.S.A. patent specification 2,893,816.

Dyeing can be carried out in a weakly acid liquor, the material appropriately being introduced into the dyebath at 40–60° C. and then dyed at the boil. It is also possible to dye under pressure at temperatures above 100° C. Furthermore, the dyestuffs can be added to spinning solutions for the manufacture of fibres containing polyacrylonitrile, or can also be applied to the unstretched fibre.

The dyeings on material containing acrylonitrile are distinguished by very good fastness to light, wet processing, rubbing and sublimation, and by a high affinity to the fibre. With anionic precipitants such as alumina, tannin and phosphotungstic or phosphomolybdic acids the dyestuffs form light-fast pigments, which can advantageously be employed in paper printing.

EXAMPLE 1

11.4 g. of 4-amino-4'-nitrodiphenylmethane are dissolved in a mixture of 40 ml. of concentrated hydrochloric acid, 40 ml. of dimethylformamide and 40 ml. of water kept at 70° C. and the mixture is then cooled to 0° C. whilst stirring. 11.7 ml. of a 30% strength NaNO₂ solution are then added dropwise to the resulting suspension, at 0–5° C., over the course of half an hour, and after stirring for a further 30 minutes excess nitrite is destroyed by adding amidosulphonic acid. After the addition of 0.5 g. of an emulsifier, 8.7 g. of 1,3,3-trimethyl-2-methylene-2,3-dihywdroindole are added dropwise to the clear solution over the course of 15 minutes, the mixture is stirred for a further 10 minutes, and 250 ml. of a 20% strength Na acetate solution are then added dropwise over the course of 2 hours, whereupon the hydrochloride of the coupling product precipitates in the form of orange-red crystals, the pH of the solution being between 4.5 and 5 towards the end of the addition. Finally, the mixture is warmed to 40° C. and 172 ml. of a 10% strength solution of NaOH are slowly added dropwise, and the whole is then stirred for a further 2 hours at 60° C., with the final pH being kept at not less than 10 by adding a few ml. of 10% strength NaOH. The coupling product, which is produced in orange-coloured crystals, is first washed with hot water and then with cold water until neutral. Yield 20.2 g. Melting point: 209–211° C. (uncorrected).

For alkylation, 19 g. of the coupling product are dissolved in 70 ml. of chlorobenzene with the addition of 1.8 g. of triisopropanolamine, 11 ml. of chlorobenzene are distilled off at 80–85° C. for dehydration, 7.3 g. of dimethyl sulphate are then added dropwise at 80° C. over the course of 15 minutes, the mixture is subsequently stirred for a further 10 hours at the same temperature, 5 ml. of water are then added, and the whole is stirred for a further 2 hours at 80° C. The chlorobenzene is removed by steam distillation, after which, following the addition of 8.5 g. of NaCl to the hot aqueous dyestuff solution, the dyestuff of formula

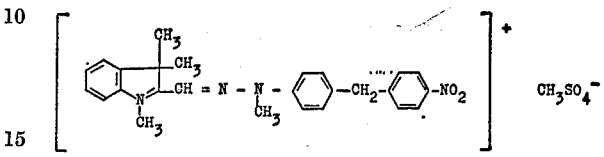

precipitates. Yield after filtration, washing with NaCl solution and drying: 22.9 g. of a reddish-tinged, yellow product.

EXAMPLE 2

4.58 g. of 4-aminodiphenylmethane are added to a mixture of 40 ml. of water and 9.75 g. of 30% strength hydrochloric acid. The suspension is stirred to 0–3° C. and diazotised with 5.9 ml. of a 30% strength sodium nitrite solution. The mixture is stirred for a further 30 minutes with a slight excess of nitrite, and excess nitrite is then destroyed by adding amidosulphonic acid. 4.32 g. of 1,3,3-trimethyl-2-methylene-2,3-dihydroindole are added dropwise to the stirred diazonium salt solution at 3–5° C. over the course of 15 minutes, 20 ml. of 20% strength sodium acetate solution are then added dropwise over the course of 3 hours, and, after reaching a temperature of 10–12° C., 20 ml. of 10% strength sodium hydroxide solution, are added over the course of 1 hour. The whole is then stirred for 12 hours at 40° C., thereafter adjusted to a pH of 10 with approx. 1.5 to 3.5 ml. of 10% strength sodium hydroxide solution, and stirred for a further 2 hours at 60° C. The coupling product, which precipitates in yellow crystals, is first washed with weakly alkaline water (approx. 0.5% strength NaOH) which is at approx. 60° C., and is then washed hot until neutral and dried at 60° C. Yield 9.2 g. Melting point: 162–163° C. (uncorrected).

For the alkylation, 9.2 g. of the azo base are dissolved in 50 ml. of chlorobenzene with the addition of 0.95 g. of triisopropanolamine. 10 ml. of chlorobenzene are distilled off at 80–85° C., 4.1 g. of dimethyl sulphate are then added dropwise at 80° C., the mixture is stirred for a further 10 hours at the same temperature, 5 ml. of water are then added and the whole is stirred for a further 2 hours at 80° C. The chlorobenzene is removed by steam distillation, wherein the final volume of the aqueous phase should be 150 ml. The yellow dyestuff obtained in a crystalline form on cooling is washed with 3% strength sodium chloride solution and dried at 60° C. Yield 10.5 g. It corresponds to the formula

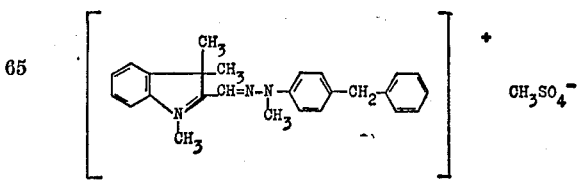

and produces dyeings in yellow shades of good fastness to light and wet processing.

On using appropriate amine components and coupling components, as well as appropriate alkylating agents, the dyestuffs quoted in the examples which follow are obtained in an analogous manner:

| Dyestuff | Colour |
|---|---|
| (indoline–CH=N–N(CH$_3$)–C$_6$H$_4$–C(CH$_3$)$_2$–C$_6$H$_4$–OH)$^+$ Cl$^-$ | Red-yellow. |
| (indoline–CH=N–N(CH$_3$)–C$_6$H$_4$–CH$_2$CH$_2$–C$_6$H$_5$)$^+$ Cl$^-$ | Yellow. |
| (indoline–CH=N–N(CH$_3$)–C$_6$H$_4$–CH$_2$–C$_6$H$_4$–CH$_3$)$^+$ CH$_3$SO$_4^-$ | Do. |
| (indoline–CH=N–N(CH$_3$)–C$_6$H$_4$(m-CH$_2$–C$_6$H$_5$))$^+$ Br$^-$ | Do. |
| (5-CH$_3$O-indoline–CH=N–N(CH$_3$)–C$_6$H$_4$(m-CH$_2$–C$_6$H$_4$–CH$_3$))$^+$ Cl$^-$ | Red-yellow. |
| (5-CH$_3$O-indoline–CH=N–N(CH$_3$)–C$_6$H$_4$–CH$_2$–C$_6$H$_5$)$^+$ CH$_3$SO$_4^-$ | Do. |
| (5-CH$_3$-indoline–CH=N–N(CH$_3$)–C$_6$H$_4$–CH$_2$–C$_6$H$_4$–NO$_2$)$^+$ Cl$^-$ | Do. |
| (5-CH$_3$-indoline–CH=N–N(CH$_3$)–C$_6$H$_4$–CH$_2$–C$_6$H$_4$–C$_2$H$_5$)$^+$ CH$_3$SO$_4^-$ | Yellow. |
| (5-CH$_3$-indoline–CH=N–N(CH$_3$)–C$_6$H$_4$–CH$_2$–C$_6$H$_5$)$^+$ Br$^-$ | Do. |

| Dyestuff | Colour |
|---|---|
| (structure with 5-methylindolenine, =CH-N=N-phenyl-N(CH₃)-CH₂-(4-methylphenyl), CH₃SO₄⁻) | Yellow. |
| (structure with indolenine, =CH-N=N-phenyl-N(CH₃)-CH₂-(2,4-dimethylphenyl), Br⁻) | Do. |
| (structure with indolenine, =CH-N=N-phenyl-N(CH₃)-CH₂-(2,5-dimethylphenyl), Br⁻) | Do. |
| (structure with indolenine, =CH-N=N-phenyl-CH₂-phenyl-C₂H₅, Cl⁻) | Do. |
| (structure with indolenine, =CH-N=N-(2-methylphenyl)-N(CH₃)-CH₂-(2,4-dimethylphenyl), CH₃SO₄⁻) | Green-yellow. |
| (structure with indolenine, =CH-N=N-(2-methylphenyl)-N(CH₃)-CH₂-(2,5-dimethylphenyl), CH₃SO₄⁻) | Do. |
| (structure with indolenine, =CH-N=N-(2-methylphenyl)-N(CH₃)-CH₂-phenyl, Cl⁻) | Do. |
| (structure with 5-methylindolenine, =CH-N=N-phenyl-N(CH₃)-CH₂-phenyl, Cl⁻) | Yellow. |
| (structure with 5-methylindolenine, =CH-N=N-phenyl-N(CH₃)-CH₂-(2,4-dimethylphenyl), CH₃SO₄⁻) | Do. |

TABLE—Continued

| Dyestuff | Colour |
|---|---|
| structure with O₂N-indoline (CH₃, CH₃, N-CH₃), -CH=N-N(CH₃)-C₆H₄-CH₂-C₆H₄-NO₂, Cl⁻ | Red-yellow. |
| structure with Cl-indoline (CH₃, CH₃, N-CH₃), -CH=N-N(CH₃)-C₆H₄-CH₂-C₆H₅, Br⁻ | Yellow. |
| structure with Cl-indoline, -CH=N-N(CH₃)-C₆H₄-CH₂-C₆H₄-C₂H₅, I⁻ | Do. |
| structure with Cl-indoline, -CH=N-N(CH₃)-C₆H₄-CH₂-C₆H₄-NO₂, CH₃SO₄⁻ | Red-yellow. |
| structure with Cl-indoline, -CH=N-N(CH₃)-C₆H₄-CH₂-C₆H₄-NO₂, Cl⁻ | Do. |
| structure with Cl-indoline, -CH=N-N(CH₃)-C₆H₄-CH₂-C₆H₄-OCH₃, Cl⁻ | Do. |
| structure with Cl-indoline, -CH=N-N(CH₃)-C₆H₄-CH₂-C₆H₄-CH₃, CH₃SO₄⁻ | Yellow. |
| structure with Cl-indoline, -CH=N-N(CH₃)(CH₂C₆H₅), CH₃SO₄⁻ | Green-yellow. |
| structure with CH₃O-C(O)-indoline, -CH=N-N(CH₃)-C₆H₄-CH₂-C₆H₄-C₂H₅, Cl⁻ | Red-yellow. |
| structure with C₆H₅-CH₂-indoline, -CH=N-N(CH₃)-C₆H₄-CH₃, Br⁻ | Yellow. |

| Dyestuff | Colour |
|---|---|
| ![structure with benzyl-indoline, CH=N-N(CH₃)-phenyl-CH₂-phenyl, I⁻] | Yellow. |
| ![structure with benzyl-indoline, CH=N-N(CH₃)-phenyl-CH₂-phenyl-NO₂, Cl⁻] | Red-yellow. |
| ![F₃C-indoline structure, CH=N-N(CH₃)-phenyl-CH₂-phenyl, Cl⁻] | Yellow. |
| ![N-benzyl-indoline structure, CH=N-N(CH₃)-phenyl-CH₂-phenyl, CH₃SO₄⁻] | Do. |
| ![indoline structure with CH=N-N(CH₃)-phenyl-CH₂-phenyl-NHCOCH₃, CH₃SO₄⁻] | Do. |

EXAMPLE 3

60 g. of the dyestuff described in Example 2, of formula

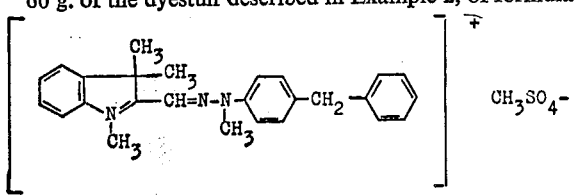

are dissolved in 800 ml. of water at 98–100° C. and this solution is added dropwise, over the course of 6 hours, to a solution of 108 g. of anhydrous sodium carbonate in 680 ml. of water, which is kept at 0° C. by adding ice. Thereafter the mixture is stirred for a further hour at 0° C., the mixture is filtered, the residue is washed until free of chloride and the yellowish, powdery product thus obtained (onium base or carbinol base) is stirred at room temperature in a mixture of 200 ml. of water and 19 g. of lactic acid (85% strength), until it has dissolved practically completely. Any small amounts of undissolved material which may have been left are filtered off, and the filtrate is evaporated at 30° and 20 mm. Hg. Residue: 55 g. of orange-coloured dyestuff of formula

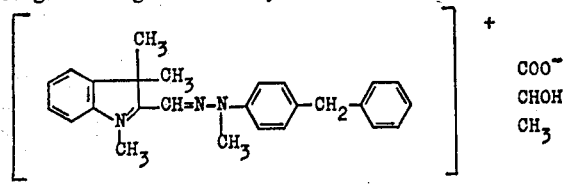

which dyes woven fabrics of polyacrylonitrile, acid-modified polyesters, such as Dacron 64®, and polyamide in a yellow shade have excellent fastness to light and to wet processing.

EXAMPLE 4

On using 9 g. of glacial acetic acid in place of the lactic acid according to Example 3, the acetate is obtained. After evaporation of the filtrate, 44 g. of an orange-coloured mass are obtained, which dyes fabrics of polyacrylonitrile and the other materials mentioned above in a yellow shade.

The itaconate is obtained in accordance with Example 3 by using 19.5 g. of itaconic acid in place of the lactic acid. After evaporating off the filtrate, an orange-coloured mass is obtained, which dyes fabrics of polyacrylonitrile in a yellow shade having excellent fastness to light and to wet processing.

The succinate is obtained in accordance with Example 3, by using 16.5 g. of succinic acid in place of the lactic acid. On evaporating the filtrate under reduced pressure, the succinate crystallises out as an orange-coloured mass, which dyes fabrics of polyacrylonitrile in a yellow shade having very good fastness to light and wet processing.

The maleate is obtained in accordance with Example 3 by employing 18 g. of maleic acid in place of the lactic acid. The orange-coloured mass obtained after evaporating the filtrate dyes fabrics of polyacrylonitrile in a yellow shade.

The adipate is obtained in accordance with Example 3 by using 22.5 g. of adipic acid in place of the lactic acid. The mass, which precipitates in orange-yellow crystals after concentrating the filtrate and subsequently cooling to 0°, dyes fabrics of polyacrylonitrile in a yellow shade.

The anion exchange is carried out in the same manner for the dyestuffs listed in the table accompanying Example 2, without the colour shades of the dyestuffs being altered.

EXAMPLE 5

6.6 g. of triisopropanolamine are added to a solution of 64 g. of the azo base manufactured according to Example 2 in 350 ml. of chlorobenzene, approx. 140 ml. of chlorobenzene are then distilled off at approx. 80° C. under reduced pressure, and 38.8 g. of p-toluenesulphonic acid methyl ester are added dropwise to the residual solution at 80–85° C. over the course of ½ hour, whilst stirring. The mixture is stirred for a further 10 hours at 80–85° C., hydrolysis is then carried out with 50 ml. of water, and the solvent is driven off in steam. The dyestuff, which precipitates in yellow needles from the aqueous solution on cooling, is further purified by reprecipitation from water. Yield 46 g. The dyestuff of formula

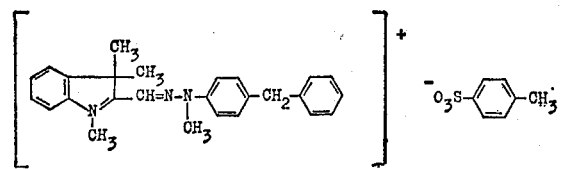

which is obtained in yellow crystals, dyes fibres of polyacrylonitrile, acid-modified aromatic polyesters, such as Dacron 64®, and acid-modified polyamide fibres in a yellow shade having excellent fastness properties.

EXAMPLE 6

12.2 g. of the azo base manufactured according to Example 2 are heated for 10 minutes with 100 ml. of chlorobenzene on a boiling waterbath, 10.2 g. of diethyl sulphate are then added dropwise, the mixture is kept at 120° C. for 24 hours and the chlorobenzene is thereafter distilled off in steam. The residue is filtered in the presence of active charcoal, salted out, after cooling, with 50 g. of sodium chloride, stirred overnight and filtered, and the filter residue is rinsed with 500 ml. of 5% strength aqueous NaCl solution. Yield: 9.2 g. of dyestuff of formula

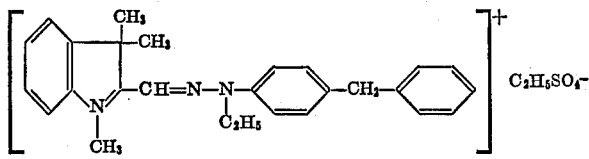

which dyes polyacrylonitrile, Dacron 64® and acid-modified polyamide fibres in yellow shades having good fastness to light and wet processing.

EXAMPLE 7

12.2 g. of the azo base manufactured according to Example 2 are dissolved in 100 ml. of chlorobenzene on a waterbath, 8.0 g. of methyl iodide are then added dropwise and thereafter the mixture is kept for 2½ hours on a boiling waterbath. The chlorobenzene is then removed by means of steam, the mixture is filtered, and the filtrate is treated with 100 g. of sodium chloride and stirred overnight. The mass which has precipitated is filtered off and washed with 500 ml. of 10% strength NaCl solution. Residue after drying: 1.8 g. The residue which remains on filtering after the steam distillation, together with the salted-out part, is recrystallised from 180 ml. of alcohol, whereupon 9.8 g. of dyestuff of formula

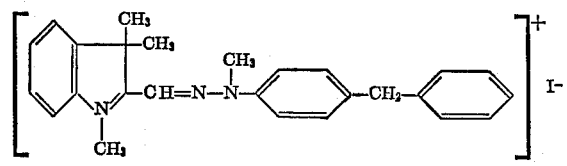

are obtained, which dyes polyacrylonitrile, acid-modified polyesters and acid-modified polyamide fibres in yellow shades having good fastness to light and wet processing.

EXAMPLE 8

A fabric of polyacrylonitrile is printed with a printing paste which was manufactured in the following manner: 30 parts by weight of the dyestuff described in Example 3, 50 parts by weight of thiodiethylene glycol, 30 parts by weight of cyclohexanol and 30 parts by weight of 30% strength acetic acid are covered with 330 parts by weight of hot water, and the solution obtained is added to 500 parts by weight of crystal gum (gum arabic as a thickener). Finally, 30 parts by weight of zinc nitrate solution are also added. The print obtained is dried, steamed for 30 minutes and subsequently rinsed. A yellow print of very good fastness properties is obtained.

EXAMPLE 9

Acid-modified poly(glycol terephthalate) fibres are introduced at 20° C., using a liquor ratio of 1:40, into an aqueous bath which per litre contains 3 to 10 g. of sodium sulphate, 0.1 to 1 g. of oleyl polyglycol ether (50 mols of ethylene oxide), 0–15 g. of dimethyl-benzyl-dodecyl-ammonium chloride and 0.15 g. of the dyestuff described in Example 3, and which has been adjusted to pH 4–5 with acetic acid. The bath is heated to 100° C. over the course of 30 minutes and kept at this temperature for 60 minutes. Thereafter, the fibres are rinsed and dried. A yellow dyeing having very good fastness properties is obtained.

EXAMPLE 10

Polyacrylonitrile fibres are introduced at 40° C., using a liquor ratio of 1:40, into an aqueous bath which per litre contains 0.75 g. of 30% strength acetic acid, 0.38 g. of sodium acetate and 0.15 g. of a dyestuff, the manufacture of which was described in Example 3. The bath is heated to the boil over the course of 20–30 minutes and kept at this temperature for 30–60 minutes. After rinsing and drying, a yellow dyeing having very god fastness properties is obtained.

We claim:

1. Hydrazone dyestuff of the formula

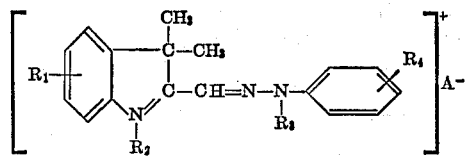

wherein $R_1$ and $R_4$ represent hydrogen, halogen, lower alkyl, cyclohexyl, lower alkoxy, nitro, carboalkoxy where the alkoxy group contains 1–4 carbon atoms, nitrile, acetyl, propionyl, toluoyl, benzoyl, phenylmethyl, phenylethyl, phenylpropyl-(2,2), and at least one of $R_1$ and $R_4$ is phenylmethyl, phenylethyl, phenylpropyl-(2,2) or any of these three radicals substituted in the phenyl ring by lower alkyl, halogen, nitrile, nitro, hydroxyl, lower alkoxy, formylamino, acetylamino, n-propionylamino, benzoylamino, 4-chlorobenzoylamino, 4-methylbenzoylamino, or carboalkoxy where the alkoxy group contains 1–4 carbon atoms;

$R_2$ represents lower alkyl, cyclohexyl, phenylmethyl, phenylethyl, phenylpropyl-(2,2) or an aromatic carbocycle of 6–10 carbon atoms, $R_3$ represents lower alkyl, cyclohexyl, phenylmethyl, phenylethyl, phenylpropyl-(2,2), allyl, methylallyl, or lower alkyl substituted by lower alkoxy or carboalkoxy where the alkoxy group contains 1–4 carbon atoms; and $A^-$ represents an anion.

2. Hydrazone dyestuff of formula

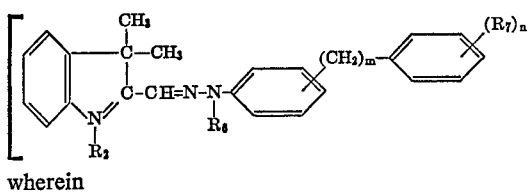

wherein $R_5$ represents methyl, ethyl or benzyl,
$R_6$ represents lower alkyl,
$R_7$ represents hydrogen or identical or different methyl, ethyl, hydroxyl, methoxy, acetylamino, benzoylamino or nitro groups,
$m$ and $n$ represent the numbers 1 or 2 and $A^-$ represents an anion.

3. Hydrazone dyestuff according to claim 2, wherein $R_6$ represents the methyl group.

4. Hydrazone dyestuff of claim 2, wherein $A^-$ represents the formate, acetate or lactate anion.

5. The dyestuff of the formula

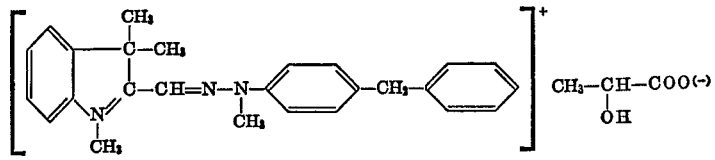

6. The dyestuff of the formula

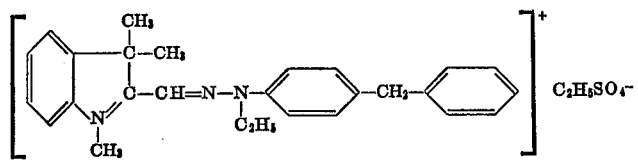

7. The dyestuff of the formula

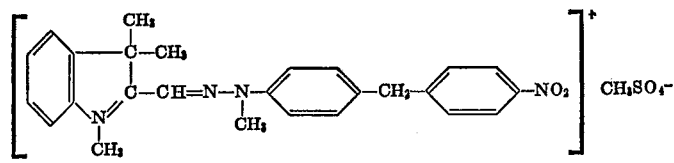

8. The dyestuff of the formula

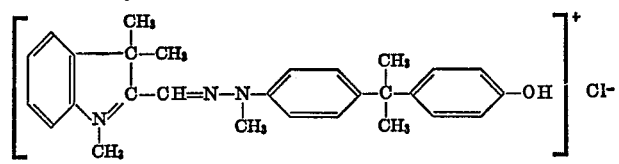

9. The dyestuff of the formula

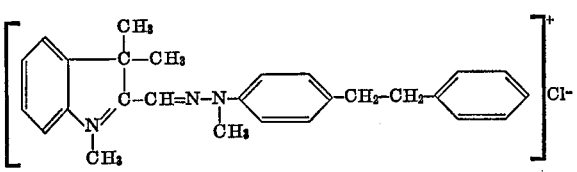

10. The dyestuff of the formula

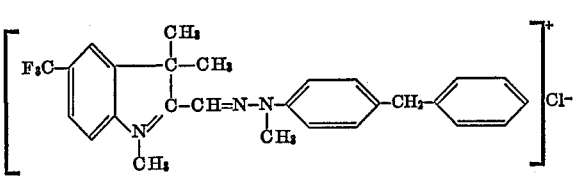

11. The dyestuff of the formula

References Cited
UNITED STATES PATENTS
3,345,355  10/1967  Raue _____ 260—240 G X
FOREIGN PATENTS
1,214,896  11/1959  France _____ 260—240 G JOHN D. RANDOLPH, Primary Examiner U.S. Cl. X.R.

8—12, 54.2, 162 R, 177 R, 178 R, 178 E, 179; 106—22, 23; 260—141, 165

UNITED STATES PATENT OFFICE
CERTIFICATE OF CORRECTION

Patent No. 3,773,764  Dated November 20, 1973

Inventor(s) Klaus-Friedrich et al

It is certified that error appears in the above-identified patent and that said Letters Patent are hereby corrected as shown below:

Column 1, line 35, "polamide" should read ---polyamide---.

Column 2, line 71, "dystuffs" should read ---dyestuffs---.

Column 5, line 54, "dihywdroindole" should read ---dihydroindole---.

Column 7, third formula, "$-CH_3=$" should read --- $-CH=$ ---.

Column 7, third formula, "$-CH_3$" should read --- $-C_2H_5$ ---.

Column 9, fifth formula, "$-CH_2$" should read --- $-CH_3$ ---.

Column 11, third formula, "$-C_2H_3$" should read --- $C_2H_5$ ---.

Column 11, fifth formula, "$-NO_2$" should read --- $-OH$ ---.

Column 13, first formula, "1-" should read ---Cl- ---.

Column 15, line 60, "remoxed" should read ---removed---.

Column 16, line 42, "god" should read ---good---.

Signed and sealed this 4th day of February 1975.

(SEAL)
Attest:

McCOY M. GIBSON JR.  
Attesting Officer

C. MARSHALL DANN  
Commissioner of Patents